(12) United States Patent
Gritter et al.

(10) Patent No.: US 11,768,753 B2
(45) Date of Patent: Sep. 26, 2023

(54) SYSTEM AND METHOD FOR EVALUATING AND DEPLOYING DATA MODELS HAVING IMPROVED PERFORMANCE MEASURES

(71) Applicant: CERNER INNOVATION, INC., North Kansas City, MO (US)

(72) Inventors: James Gritter, Parkville, MO (US); Ashwin Chhetri, Darjeeling (IN); Rahul Jain V, Bangalore (IN); Uttam Ramamurthy, Bangalore (IN); Pankaj Saxena, Pune (IN)

(73) Assignee: Cerner Innovation, Inc., Kansas City, MO (US)

( * ) Notice: Subject to any disclaimer, the term of this patent is extended or adjusted under 35 U.S.C. 154(b) by 0 days.

(21) Appl. No.: 17/811,781

(22) Filed: Jul. 11, 2022

(65) Prior Publication Data
US 2023/0205665 A1 Jun. 29, 2023

Related U.S. Application Data

(60) Provisional application No. 63/266,109, filed on Dec. 29, 2021.

(51) Int. Cl.
*G06F 11/34* (2006.01)
*G06F 11/30* (2006.01)
*G06F 18/214* (2023.01)

(52) U.S. Cl.
CPC ...... *G06F 11/3466* (2013.01); *G06F 11/3075* (2013.01); *G06F 18/214* (2023.01)

(58) Field of Classification Search
None
See application file for complete search history.

(56) References Cited

U.S. PATENT DOCUMENTS

| | | | | |
|---|---|---|---|---|
| 11,128,737 | B1 * | 9/2021 | Fox | G06F 18/29 |
| 11,468,369 | B1 * | 10/2022 | Wilson | G06F 18/21322 |
| 2020/0012584 | A1 * | 1/2020 | Walters | G06F 16/24568 |
| 2020/0184379 | A1 * | 6/2020 | Dong | G06N 5/01 |
| 2021/0326782 | A1 * | 10/2021 | Achin | G06F 9/5011 |

* cited by examiner

*Primary Examiner* — Qing Chen
(74) *Attorney, Agent, or Firm* — Invoke

(57) ABSTRACT

Methods, systems, and computer-readable media are disclosed herein for a concurrent comparative tool for assessing multiple versions of a data model in a pre-deployment environment to ensure that any subsequently deployed version will perform than a current version of the data model. In aspects, the tool extracts observed and predictive data for various versions and comparatively evaluates the performance measures of each version. The performance measures can be validated across the versions to determine and select a leading version that has demonstrated improve technological performance and predictive accuracy. The leading version can be deployed.

20 Claims, 14 Drawing Sheets

```
import datetime, logging
import pandas as pd
def preprocessing(
    config_file: dict,
    start_time: datetime,
    end_time: datetime,
    mapping_versions: list):
    ##### Get the insights and actuals data ####
    insight_df = get_data_from_database("database query using parameters in config_file")
    actuals_df = get_data_from_database("database query using parameters in config_file")
    ##### Perform data transformation to organize the data in the insight and actual dataframe #####
    ##### Merge the insights and actuals dataframe based on version using mapping file and model using config_file #####
    final_df = pd.DataFrame()
    for version_map in mapping versions:
        sub_insight_df = insight_df[insight_df["insight_version"] == version_map["insight_version"] ]
        sub_actuals_df = actuals_df[actuals_df["actuals_version"] == version_map["actuals_version"] ]
        ##### Merging sub_insight_df and sub_actuals_df #####
        final_df = final_df.append(sub_insight_df.merge(sub_actuals_df) )
    ##### generate compute_dic using config_file#####
    compute = {
        "metrics": ['mape', 'mae'] from config_file",
        "y_true_col": "actuals column name",
        "y_pred_col": "insight column name",
        "subtype": "subtype/model column name",
        "namespace": "what type of compute is being performed .i.e. metric,drift,violation,bias",
        "insignt_version": " insight version column name",
        "actual_version": "actual version column name",
        "dimension": [
            {
                "Name: "<dimension name>",
                "Value": "<dimension value>"
            }
        ],
        "return_data": "whether to append data to the monitoring report"
    }
    return final__df,compute
```

FIG. 2.

```
import datetime, logging
import pandas as pd
def preprocessing(                                    300
    config_file: dict,
    start_time: datetime,
    end_time: datetime,
    mapping_versions: list):
    ##### Get the insights and actuals data ####
    insight_df = get_data_from_database("database query using parameters in config_file")
    actuals_df = get_data_from_database("database query using parameters in config_file")
    ##### Perform data transformation to organize the data in the insight and actual dataframe #####
    ##### Merge the insights and actuals dataframe based on version using mapping file and model using config_file #####
    final_df = pd.DataFrame()
    for version_map in mapping versions:
        sub_insight_df = insight_df[insight_df["insight_version"] == version_map["insight_version"] ]
        sub_actuals_df = actuals_df[actuals_df["actuals_version"] == version_map["actuals_version"] ]
        ##### Merging sub_insight_df and sub_actuals_df #####
        final_df = final_df.append(sub_insight_df.merge(sub_actuals_df) )
    ##### generate compute_dic using config_file#####
    compute = {
        "metrics": "['mape', 'mae'] from config_file",
        "y_true_col": "actuals column name",
        "y_pred_col": "insight column name",
        "subtype": "subtype/model column name",
        "namespace": "what type of compute is being performed .i.e. metric,drift,violation,bias",
        "insight_version": "insight version column name",
        "actual_version": "actual version column name",
        "dimension": [
            {
                "Name": "<dimension name>",
                "Value": "<dimension value>"
            },
        ],
        "return_data": "whether to append data to the monitoring report"
    }
    return final_df,compute
```

*FIG. 3.*

```
import datetime, logging
import pandas as pd
def preprocessing(
    config_file: dict,
    start_time: datetime,
    end_time: datetime,
    mapping_versions: list):
    ##### Get the insights and actuals data ####
    insight_df = get_data_from_database("database query using parameters in config_file")
    actuals_df = get_data_from_database("database query using parameters in config_file")
    ##### Perform data transformation to organize the data in the insight and actual dataframe #####
    ##### Merge the insights and actuals dataframe based on version using mapping file and model using config_file #####
    final_df = pd.DataFrame()
    for version_map in mapping_versions:
        sub_insight_df = insight_df[insight_df["insight_version"] == version_map["insight_version"] ]
        sub_actuals_df = actuals_df[actuals_df["actuals_version"] == version_map["actuals_version"] ]
        ##### Merging sub_insight_df and sub_actuals_df #####
        final_df = final_df.append(sub_insignt_df.merge(sub_actuals_df) )
    ##### generate compute_dic using config_file#####
    compute = {
        "metrics": ['mape', 'mae'] from config_file",
        "y_true_col": "actuals column name",
        "y_pred_col": "insight column name",
        "subtype": "subtype/model column name",
        "namespace": "what type of compute is being performed .i.e. metric,drift,violation,bias",
        "insignt_version": " insight version column name",
        "actual_version": "actual version column name",
        "dimension": [
            {
                "Name: "<dimension name>",
                "Value": "<dimension value>"
            }
        ],
        "return_data": "whether to append data to the monitoring report"
    }
    return final_df,compute
```

```
import datetime, logging
import pandas as pd
def preprocessing(
    config_file: dict,
    start_time: datetime,
    end_time: datetime,
    mapping_versions: list):
    ##### Get the insights and actuals data ####
    insight_df = get_data_from_database("database query using parameters in config_file")
    actuals_df = get_data_from_database("database query using parameters in config_file")
    ##### Perform data transformation to organize the data in the insight and actual dataframe #####
    ##### Merge the insights and actuals dataframe based on version using mapping file and model using config_file #####
    final_df = pd.DataFrame()
    for version_map in mapping_versions:
        sub_insight_df = insight_df[insight_df["insight_version"] == version_map["insight_version"] ]
        sub_actuals_df = actuals_df[actuals_df["actuals_version"] == version_map["actuals_version"] ]
        #### Merging sub_insight_df and sub_actuals_df #####
        final_df = final_df.append(sub_insignt_df.merge(sub_actuals_df) )
    ##### generate compute_dic using config_file#####
    compute = {
        "metrics": ["mape", "mae"] from config_file",
        "y_true_col": "actuals column name",
        "y_pred_col": "insight column name",
        "subtype": "subtype/model column name",
        "namespace": "what type of compute is being performed .i.e. metric,drift,violation,bias",
        "insignt_version": "insight version column name",
        "actual_version": "actual version column name",
        "dimension": [
            {
                "Name": "<dimension name>",
                "Value": "<dimension value>"
            }
        ],
        "return_data": "whether to append data to the monitoring report"
    }
    return final_df,compute
```

*FIG. 5.*

```
import datetime, logging
import pandas as pd
def preprocessing(
    config_file: dict,
    start_time: datetime,
    end_time: datetime,
    mapping_versions: list):
    ##### Get the insights and actuals data ####
    insight_df = get_data_from_database("database query using parameters in config_file")
    actuals_df = get_data_from_database("database query using parameters in config_file")
    ##### Perform data transformation to organize the data in the insight and actual dataframe #####
    ##### Merge the insights and actuals dataframe based on version using mapping file and model using config_file #####
    final_df = pd.DataFrame()
    for version_map in mapping versions:
        sub_insight_df = insight_df[insight_df["insight_version"] == version_map["insight_version"] ]
        sub_actuals_df = actuals_df[actuals_df["actuals_version"] == version_map["actuals_version"] ]
        ##### Merging sub_insight_df and sub_actuals_df #####
        final_df = final_df.append(sub_insignt_df.merge(sub_actuals_df) )
    ##### generate compute_dic using config_file#####
    compute = {
        "metrics": "['mape','mae'] from config_file",
        "y_true_col": "actuals column name",
        "y_pred_col": "insight column name",
        "subtype": "subtype/model column name",
        "namespace": "what type of compute is being performed .i.e. metric,drift,violation,bias",
        "insignt_version": " insight version column name",
        "actual_version": "actual version column name",
        "dimension": [
            {
                "Name": "<dimension name>",
                "Value": "<dimension value>"
            },
        ],
        "return_data": "whether to append data to the monitoring report"
    }
    return final_df,compute
```

*FIG. 6.*

```
import datetime, logging
import pandas as pd
def preprocessing(
    config_file: dict,
    start_time: datetime,
    end_time: datetime,
    mapping_versions: list):
Get the insights and actuals data ####
insight_df = get_data_from_database("database query using parameters in config_file")
actuals_df = get_data_from_database("database query using parameters in config_file")
Perform data transformation to organize the data in the insight and actual dataframe #####
Merge the insights and actuals dataframe based on version using mapping file and model using config_file ####
final_df = pd.DataFrame()
for version_map in mapping versions:
    sub_insight_df = insight_df[insight_df["insight_version"] == version_map["insight_version"] ]
    sub_actuals_df = actuals_df[actuals_df["actuals_version"] == version_map["actuals_version"] ]
    ##### Merging sub_insight_df and sub_actuals_df #####
    final_df = final_df.append(sub_insignt_df.merge(sub_actuals_df) )
generate compute_dic using config_file#####
compute = {
    "metrics": ["mape', 'mae'] from config_file",
    "y_true_col": "actuals column name",
    "y_pred_col": "insight column name",
    "subtype": "subtype/model column name",
    "namespace": "what type of compute is being performed .i.e. metric,drift,violation,bias",
    "insight_version": "insight version column name",
    "actual_version": "actual version column name",
    "dimension": [
        {
            "Name": "<dimension name>",
            "Value": "<dimension value>"
        }
    ],
    "return_data": "whether to append data to the monitoring report"
}
return final_df,compute                                                  ~700
```

*FIG. 7.* final_df

| executiondatetime(index 1) | applies_at (index 2) | insight | actual | subtype | insight_version | actual_version |
|---|---|---|---|---|---|---|
| 2021-11-10T00:02:00.325Z | 2021-11-11T00:00:00.000Z | 45.394602 | 46 | ED_4 | v1 | v1 |
| 2021-11-10T00:01:16.789Z | 2021-11-11T00:00:00.000Z | 45.588094 | 45 | INPT_4 | v1 | v1 |
| 2021-11-10T00:02:00.325Z | 2021-11-11T00:00:00.000Z | 46.394602 | 46 | ED_4 | v2 | v2 |
| 2021-11-10T00:01:16.325Z | 2021-11-11T00:00:00.000Z | 44.525567 | 45 | INPT_4 | v2 | v2 |

| metrics | result | timestamp | namespace | start_date | end_date | number_of_comparison | data |
|---|---|---|---|---|---|---|---|
| mape | 9.726 | 2021-05-06T00:02:00.325Z | User1_metrics | 2021-11-10T00:02:00.325Z | 2021-11-12T00:02:00.325Z | 18 | None |
| mae | 5.001 | 2021-05-06T00:02:00.325Z | User1_metrics | 2021-11-10T00:02:00.325Z | 2021-11-12T00:02:00.325Z | 18 | None |
| mape | 13.281 | 2021-05-06T00:02:00.325Z | User1_metrics | 2021-11-10T00:02:00.325Z | 2021-11-12T00:02:00.325Z | 18 | None |
| mae | 1.557 | 2021-05-06T00:02:00.325Z | User1_metrics | 2021-11-10T00:02:00.325Z | 2021-11-12T00:02:00.325Z | 18 | None |

| insight_version | actual_version | monitoring_version | use_case | client | entity_value | subtype |
|---|---|---|---|---|---|---|
| v1 | v1 | v1.1.0 | capacityforcast | user1 | value1 | ED_4 |
| v1 | v1 | v1.1.0 | capacityforcast | user1 | value1 | INPT_4 |
| v2 | v2 | v1.1.0 | capacityforcast | user1 | value1 | ED_4 |
| v2 | v2 | v1.1.0 | capacityforcast | user1 | value1 | INPT_4 |

*alert* Monitoring – Metrics – capacityforcast for user1 value1 v1/v1
Alert Details:
- Client Mnemonic: user1
- Entity: value1
- SystemCategory: capacityforcast
- Type: metrics
- State: alert
- Reason for State: Threshold crossed
- ExecutionTimestamp: Sunday 6 June, 2021 07:47:51 UTC
- Start Date: Sunday 6 June, 2021 07:47:51 UTC
- End Date: Sunday 6 June, 2021 07:47:51 UTC
- Monitoring Version: v1.1.0
- Insight Version: v1
- Actual Version: v1
- Baseline Version: None
* INPT:
- mae: 7.152 value violated the Maximum metric threshold which is 2.05
* ED:
- mae: 3.194 value violated the Maximum metric threshold which is 2.957

*FIG. 11.*

SYSTEM AND METHOD FOR EVALUATING AND DEPLOYING DATA MODELS HAVING IMPROVED PERFORMANCE MEASURES

This non-provisional patent application claims priority benefit to provisional patent application No. 63/266,109, entitled "System and Method for Evaluating and Deploying Data Models Having Improved Performance Measures," filed on Dec. 29, 2021, the entirety of which is incorporated by reference herein. This non-provisional application filed at the United States Patent and Trademark Office is related to co-pending non-provisional application entitled "Model Validation Based on Sub-Model Performance," and co-pending non-provisional application entitled "System, methods, and processes for Model Performance Aggregation," both filed contemporaneously with this non-provisional application, the entirety of which is incorporated by reference herein.

TECHNICAL FIELD

This application relates to machine-learning data models. More particularly, this application relates to evaluation of data model prediction accuracy and technological performance measures.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description.

In brief and at a high level, this disclosure describes, among other things, methods, systems, and computer-readable media for comparatively evaluating distinct versions of a machine-learning data model (hereinafter "model") for technological performance and/or predictive accuracy, and deploying version(s) having demonstrated improvements to technological performance and/or predictive accuracy relative to other version(s). As will be described, aspects of the invention discussed hereinafter monitor and comparatively evaluate technological performance and/or predictive accuracy by monitoring multiple and varied versions of a model in order to select (e.g., manually or autonomously via a processor without user input) deploy a leading version that is indicated as having the greatest prediction accuracy and/or other indications of superior performance (e.g., metrics, bias, data drift). Prior to deployment, one or more versions of a model can be autonomously (e.g., without user selection, input, and/or intervention) evaluated relative to one or more other (e.g., in use, currently deployed, previously deployed) versions of the model.

A computerized method for evaluating and improving model version performance and accuracy is provided in an aspect of the present invention. In accordance with the method, a plurality of datasets are received for a plurality of versions of a model. Each of the plurality of datasets includes a plurality of predictions of a corresponding version of the model. A configuration file and a mapping file are received, in aspects. A plurality of version-performance reports are generated from the plurality of datasets, based on the configuration file and the mapping file that are received, in various aspects. Each of the plurality of version-performance reports includes a plurality of performance measures determined for the corresponding version of the model. A baseline file is received in aspects. The plurality of version-performance reports are validated based on the baseline file. In accordance with the method, a leading version in the plurality of versions is determined, based on a corresponding plurality of performance measures relative to the plurality of version-performance reports of the plurality of versions. The leading version of the model is deployed, in some aspects.

Another aspect provides one or more non-transitory computer-readable media having computer-executable instructions embodied thereon that, when executed, perform a method for evaluating and improving model version performance and accuracy. In accordance with the media, a plurality of datasets are received for a plurality of versions of a model. Each of the plurality of datasets includes a plurality of predictions of a corresponding version of the model, in various aspects. A configuration file and a mapping file are received. A plurality of version-performance reports are generated from the plurality of datasets, based on the configuration file and the mapping file, in aspects. Each of the plurality of version-performance reports includes a plurality of performance measures determined for the corresponding version of the model, in some aspects. A baseline file is received. The plurality of version-performance reports are validated based on the baseline file, in aspects. A leading version in the plurality of versions is determined, in some aspects, based on a corresponding version-performance report of the leading version indicating that the leading version has improved performance relative to at least one other version in the plurality of versions of the model. The leading version of the model is deployed, in some aspects.

A system is provided for evaluating and improving model version performance and accuracy in another aspect. The system comprises a data model performance monitoring system that, via one or more processors, executes a script. The data model performance monitoring system receives a plurality of datasets for a plurality of versions of a model, wherein each of the plurality of datasets includes a plurality of predictions of a corresponding version of the model. The data model performance monitoring system receives a configuration file and a mapping file, in some aspects. Via the script, the data model performance monitoring system generates a plurality of version-performance reports from the plurality of datasets, based on the configuration file and the mapping file, in aspects. In some aspects, each of the plurality of version-performance reports includes a plurality of performance measures determined for the corresponding version of the model. The data model performance monitoring system receives a baseline file, and validates the plurality of version-performance reports based on the baseline file. The system includes, in some aspects, a monitoring dashboard module that determines a leading version in the plurality of versions based on corresponding plurality of performance measures in the version-performance report of the leading version relative to the plurality of version-performance reports of the plurality of versions. In such aspects, the corresponding version-performance report of the leading version indicates that the leading version has improved performance relative to other versions in the plurality of versions of the model. The monitoring dashboard module communicates the leading version of the model for deployment, in some aspects.

BRIEF DESCRIPTION OF THE DRAWINGS

Aspects are described in detail below with reference to the attached drawings figures, wherein:

FIG. 2 depicts example computer-executable instructions suitable for implementation via the example system of FIG. 1, in accordance with aspects discussed herein;

FIG. 3 depicts example computer-executable instructions suitable for implementation via the example system of FIG. 1, in accordance with aspects discussed herein;

FIG. 4 depicts example computer-executable instructions suitable for implementation via the example system of FIG. 1, in accordance with aspects discussed herein;

FIG. 5 depicts example computer-executable instructions suitable for implementation via the example system of FIG. 1, in accordance with aspects discussed herein;

FIG. 6 depicts example computer-executable instructions suitable for implementation via the example system of FIG. 1, in accordance with aspects discussed herein;

FIG. 7 depicts example computer-executable instructions suitable for implementation via the example system of FIG. 1, in accordance with aspects discussed herein;

FIG. 9 depicts an example report generated by the example system of FIG. 1, in accordance with aspects discussed herein;

FIG. 10 depicts an example performance report generated by the example system of FIG. 1, in accordance with aspects discussed herein;

FIG. 11 depicts example alert generated by the example system of FIG. 1, in accordance with aspects discussed herein;

DETAILED DESCRIPTION

Figure 1:
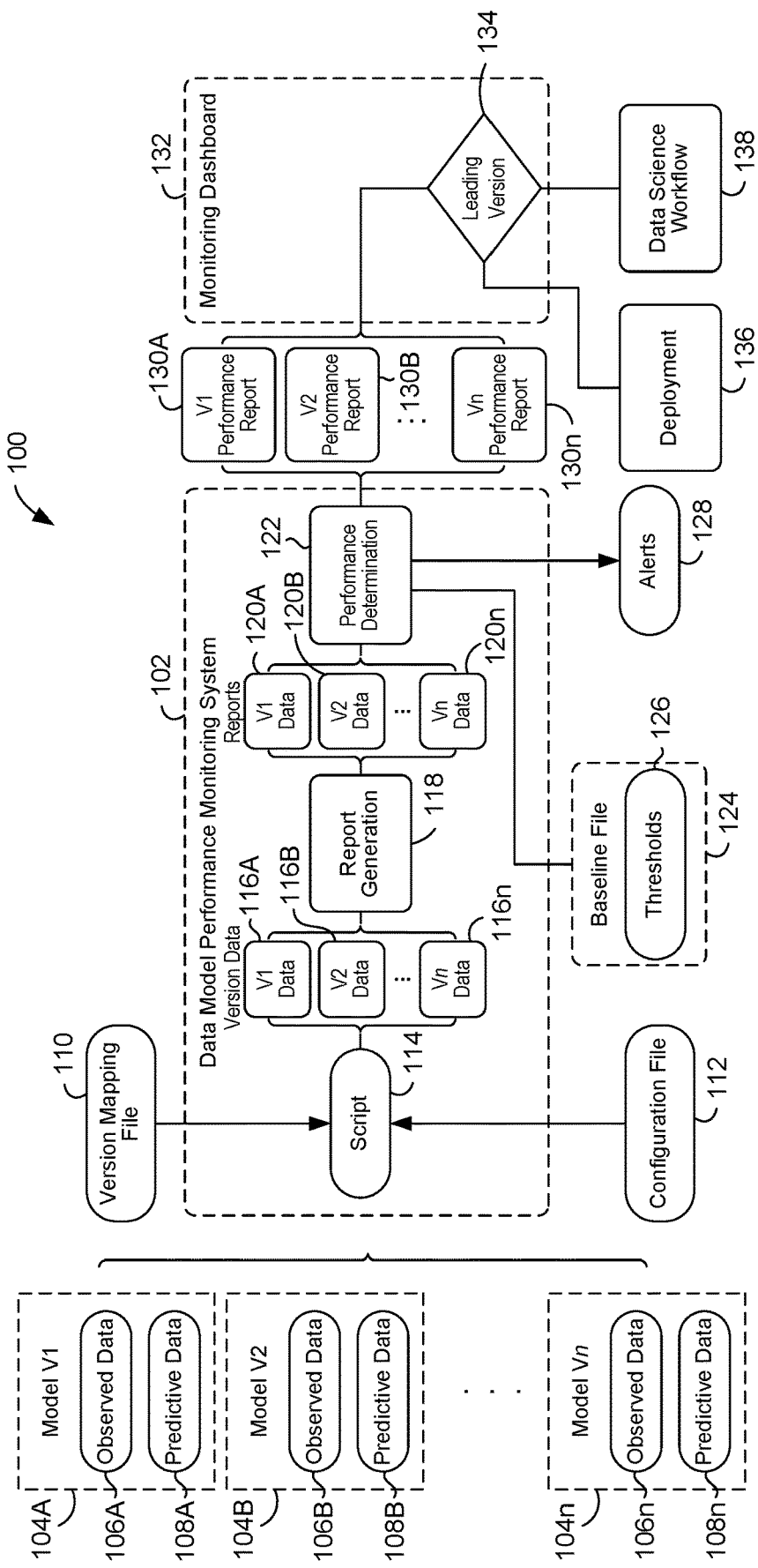
FIG. 1 is a block diagram of an example system in accordance with aspects discussed herein.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Overview

Aspects of the invention herein provide a pre-deployment environment that concurrently tests and measures the technological performance of and the accuracy of output of different versions of a particular data model. Testing of multiple versions can be autonomously performed in parallel. Aspects herein enable direct comparison of technological performance and output accuracy across different versions of a particular data model. The aspects also facilitate and/or enable manual (e.g., semi-autonomous with user interaction) and/or autonomous (e.g., without requiring user input) selection of one or more superior versions of a data model for deployment over other versions of the data model that have reduced, impaired, or degraded technological performance and/or output accuracy. Technological performance measures such as metrics and/or prediction accuracy can be compared to baselines, minimums, thresholds, and/or ranges (e.g., with or without upper and lower/flanking buffers) that serve to "validate" the data model versions. Technological performance measures can be defined with user-customizations, industry-based standards, or a combination thereof.

The selected data model version is deployed in order to 'upgrade', update, and/or replace another data model version that has been deployed and/or that is currently in use, for example. In such an aspect, the selected data model version is selected for deployment specifically because it has demonstrated improved or superior technological performance measures and/or prediction accuracy relative to the technological performance measures and/or prediction accuracy of a currently in-use data model version, based on the autonomous testing and evaluations discussed hereinafter. As such, the de selected data model version can then be subsequently deployed based on its demonstrated stability and improvement over an existing, in-use data model version. The newly-deployed data model version thus replaces the current data model version.

More specifically, systems, methods, and media herein retrieve, obtain, and/or receive one or more dataset(s) for one or more distinct machine-learning/artificial intelligence data model versions, which can include different data models and/or different data model types, in various aspects. In some aspects, one or more dataset(s) are received for each of a plurality of distinct machine-learning/artificial intelligence data model versions, for one or more distinct or different models. The datasets include observed data and predictive data stored in one or more databases. The datasets are ingested and consumed by a computer programming script, in aspects. The script uses a version mapping file and a configuration file to transform and restructure each version-specific dataset into corresponding reports, in various aspects. Each version-specific report is evaluated to identify, locate, and extract technological performance measures, such as metrics, prediction accuracy, bias, data drift, and the like from the corresponding dataset. From this evaluation, version-performance reports are generated and/or compiled so that each data model version can be directly compared to others. Based on a comparison of the version-performance reports, alert(s) can be autonomously issued when performance measures are determined by computer-driven methods, systems, and media herein to be in violation of baselines, minimums, thresholds, and/or ranges (e.g., with or without upper and lower/flanking buffers) that serve to "validate" the performance measures in the version-performance reports. The version-performance reports, violations, alerts, and the like can also be stored in one or more databases. Also, based on the comparison, one or more data model versions are manually or autonomously selected for deployment as having demonstrated improved technological performance measures and/or superior prediction accuracy relative to the technological performance measures and/or prediction accuracy of another currently in-use version of the data model.

Accordingly, the methods, systems, and media discussed herein provide a technological improvement to the technical field of data model testing and evaluation. For example, the methods, systems, and media discussed herein provide a technological solution to a technological shortcoming: the absence of a concurrent comparative tool for assessing multiple versions of a data model in a pre-deployment environment to ensure that any subsequently deployed version will perform better (e.g., technological performance and/or output accuracy) than the presently deployed version of the data model. Other systems are reactive in nature and cannot accurately and concurrently assess the performance of a new data model version until after deployment and output capture for the new data model. In contrast, aspects herein represent a paradigm shift to a proactive approach that provides a concurrent comparative tool for assessing multiple versions of a data model in a pre-deployment environment to ensure that a subsequently deployed version will perform better than the presently deployed version of the data model.

Definitions

As used herein, the terms "observed data", "ground truth", "actuals", and "targets" are used interchangeably to refer to empirical data and/or observed real-world information encoded as data. For example, observed data includes measured, captured, or recorded values representing and/or quantifying an event or a variable for an outcome that has occurred. In one example, observed data includes a value for a total patient volume of a specific healthcare entity that occurred over a defined six month time period, as recorded in historical reporting data of the healthcare entity.

As used herein, the term "predictive data" refers to any and all data that is input to and output from a version of a data model. For example, predictive data can include input(s) such as training datasets that are ingested to generate and trigger output. Additionally or alternatively, predictive data can include output(s) generated or produced from the data model version, such as prediction(s) made by that the version of the data model using the input(s). Predictive data can also include metadata related to the data model, metadata related to the data version of the data model, metadata related to the data model version's input, and/or metadata related to the data model version's output. Predictive data can refer to other output of the data model version.

As used herein, the terms "model" and "data model" are used interchangeably to refer to a machine learning/artificial intelligence type of data model that is defined by algorithmic decision logic. A data model (and any version thereof) can include features such as decision logic, computational layers, neural networks, Markov chains, weighting algorithms (specific or non-specific to variables, values, layers, submodels), and/or Random Forests. Although referred to in the singular, it will be understood that a data model (and any version thereof) can include a plurality of specific submodels that operate together in a particular sequence or in parallel, for example, that contribute to output such as predictions.

As used herein, a "version" and a "data model version" are used interchangeably to refer to a particular iteration of a data model having defined configurations for the input, operations of (e.g., decision logic), and/or output that are specific to or unique to that particular iteration.

As used herein, the terms "script" and "computer programming script" are used interchangeably to refer to computer-readable and -executable instructions/programming code that are an expression of instructions that cause, manage, and facilitate performance of a sequence of operational steps by a computer, in an automated or semi-automated manner.

As used herein "performance measures" refer to measurements captured that represent and quantify aspects of the technological performance and prediction accuracy (or inaccuracy) of a model version and/or other behavior. Performance measures can include, for example, metrics, prediction accuracy, bias, data drift, noise, variance, and the like. Examples of metrics include Measured Absolute Percentage Error (MAPE), Mean Absolute Error (MAE), and/or Root Mean Squared Error (RMSE), though other metrics and corresponding algorithms are contemplated and are within the scope of the invention.

Embodiments

Beginning with FIG. 1, an example of a system environment 100 is presented. The system environment 100 includes a data model performance monitoring system 102, referred to as the "system" hereinafter. The system 102 receives, obtains, retrieves, and/or ingests a plurality of different versions of the same data model. In some aspects, the plurality of different versions of a data model include, at least, a current in-use (i.e., deployed) version of a data model and an updated un-deployed version of the same data model. Alternatively the system 102 receives, obtains, retrieves, and/or ingests a plurality of different versions a plurality of different versions for each of a plurality of different data models. In such an aspect, the plurality of different versions of different data models include, for each of the different data models, at least, a current in-use (i.e., deployed) version of said data model and an updated un-deployed version of the same data model. Thus, in various aspects, multiple versions of multiple data models can be concurrently evaluated using the system 102 and methods discussed hereinafter, albeit the discussion generally refers to evaluating multiple versions of the same data model for simplicity's sake.

In FIG. 1, model versions 104A, 104B, 104n are stored in a database (not shown). Each of the model versions 104A, 104B, 104n is associated with observed data 106A, 106B, 106n and predictive data 108A, 108B, 108n corresponding a respective version, e.g., model version 104A includes observed data 106A and predictive data 108A, model version 104B stores the observed data 106B and the predictive data 108B, and so on.

The system 102 receives, obtains, retrieves, and/or ingests a version mapping file 110 and a configuration file 112, in aspects. The system 102 also includes a script 114. The script 114 operates to receive, obtain, retrieve, and/or ingest the model versions 104A, 104B, 104n including the observed data 106A, 106B, 106n and the predictive data 108A, 108B, 108n. Additionally, the script 114 operates to receive, obtain, retrieve, and/or ingest the version mapping file 110 and the configuration file 112. The script 114 may receive and/or pull the data/files in any sequence, concurrently, and/or simultaneously.

Generally, the script 114 operates to "preprocess" the model versions 104A, 104B, 104n (that include the observed data 106A, 106B, 106n and the predictive data 108A, 108B, 108n) based on information in the version mapping file 110 and the configuration file 112. In some aspects, the model versions 104A, 104B, 104n are each transformed by extracting specific information for use in making performance evaluations and restructuring the data into a cohesive format. More specifically, the script 114 captures the observed data 106A, 106B, 106n and the predictive data 108A, 108B, 108n from each or the corresponding model versions 104A, 104B, 104n.

The script 114 utilizes the version mapping file 110 to identify and locate specific data points in each model version to be evaluated, in aspects. For example, the version mapping file 110 specifies a plurality of data points or a set of data points in model version 104A to be extracted and another plurality of data points or another set of data points in model version 104B to be extracted, wherein the data points to be extracted in the different versions corresponds the same or similar variable in the model. In simpler terms, the version mapping file 110 is ingested and utilized by the script 114 so that the script can recognize which data points in different versions correspond to the same variables, events, and the like for subsequent comparisons, i.e., enables the script to map between the model versions 104A, 104B, 104n. The data points may correspond to the observed data 106A, 106B, 106n and/or the predictive data 108A, 108B, 108n. In some aspects, the version mapping file 110 is a .json file.

Figure 8:
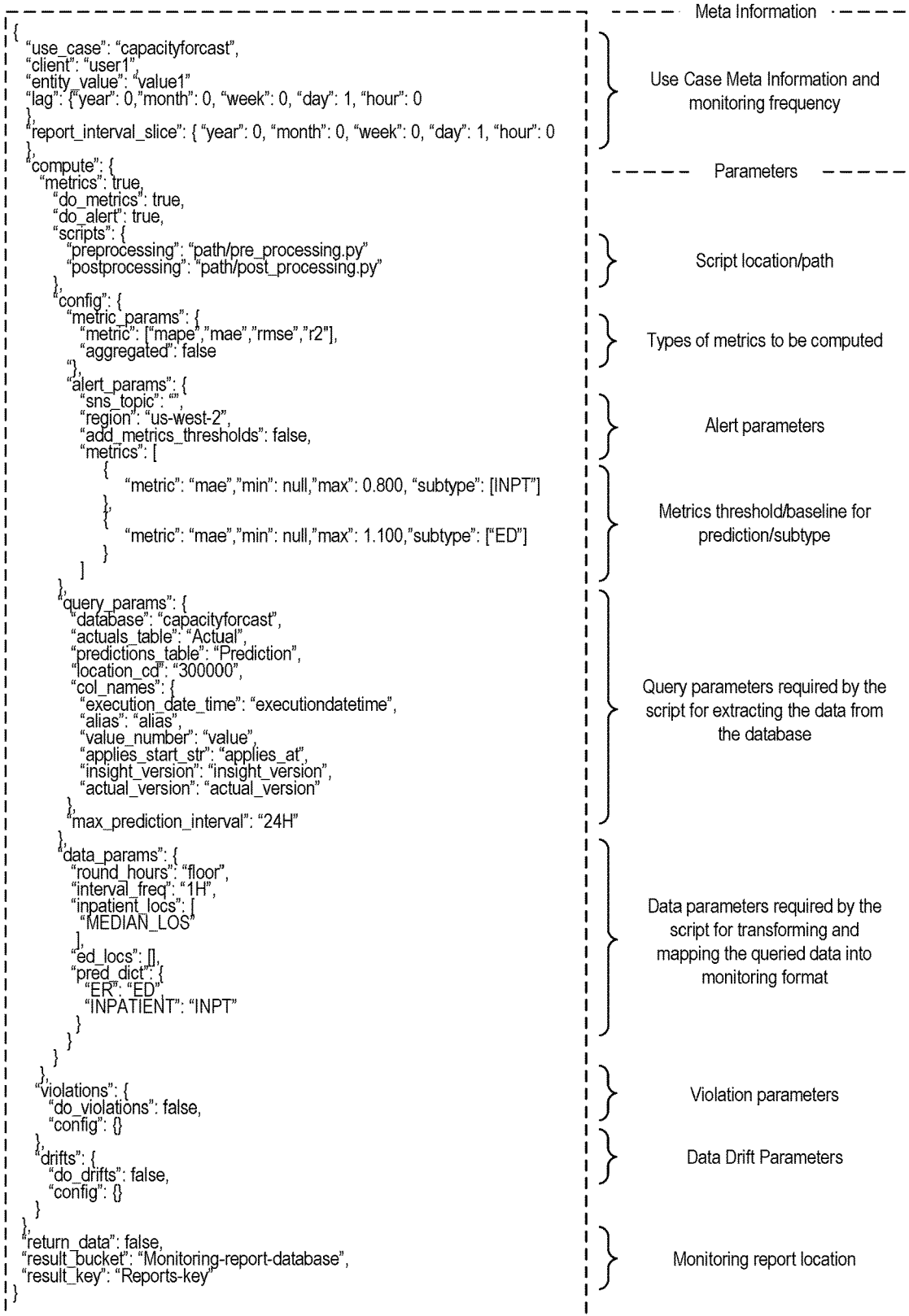
FIG. 8 depicts example computer-executable instructions for a configuration file that is suitable for implementation via the example system of FIG. 1, in accordance with aspects discussed herein.

The script 114 utilizes the configuration file 112 to identify particular configurations of the model versions 104A, 104B, 104n to evaluate using the data points identified from the mapping, in aspects. The script 114 utilizes the configuration file 112, where the configuration file 112 can specify, define, and/or indicate specific type(s) of monitoring for performance measures for subsequent action, in aspects. The configuration file 112 includes and/or defines one or more parameters and/or identifies one or more particular performance measures to be captured for all the versions of a particular model and/or for a particular model version to be evaluated. The configuration file 112 can also include metadata information that the script 114 utilizes to obtain and/or query the observed data 106A, 106B, 106n and/or the predictive data 108A, 108B, 108n associated with the model versions 104A, 104B, 104n. In one example, the configuration file 112 can include specific computer operations/functions such as query_params and data_params that the script 114 can utilize to retrieve and segregate the observed data 106A, 106B, 106n and/or the predictive data 108A, 108B, 108n from the model versions 104A, 104B, 104n, for example, segregating and/or aggregating by various subcategories and/or by version. FIG. 8 depicts an example of computer-executable instructions for a configuration file 800.

Turning to FIG. 2, an example of computer-executable instructions 200 are depicted for implementation via the system 102. For example, FIG. 3 depicts box 300 surrounding an example portion of computer-executable instructions for a script to call on and receive a config_file and mapping_versions file. In FIG. 4, box 400 surrounds another example portion of computer-executable instructions for extracting predictive data (e.g., insight_df) and/or observed data (e.g., actuals_df) using parameters defined in config_file. FIG. 5 depicts box 500, which surrounds yet another example portion of computer-executable instructions for utilizing version_map in mapping_versions to recognize which data point(s) in the extracted predictive data and/or extracted observed data corresponds to the same variables, events, and the like for subsequent comparisons across distinct versions of the data model. Utilizing the computer-executable instructions, for example, the script 114 can query the observed data 106A, 106B, 106n and the predictive data 108A, 108B, 108n of the model versions 104A, 104B, 104n using parameters of the configuration file 112. Then, using the computer-executable instructions, for example, the script can filter only the required data points from the versions based on the version mapping file 110. In one such example, for each version, the filtered data points of the predictive data and the observed data of that model are merged and communicated to a compute dictionary with a data frame. The merged-and-filtered data as well as the corresponding data frame form a final_df file, and the compute dictionary acts to provide metadata regarding final_df file, in such an aspect.

Returning to FIG. 1, the script 114 generates version data files 116A, 116B, 116n. FIG. 9 depicts an example of a version data file 900, such as version data files 116A, 116B, 116n. In aspects, each data model version is transformed into a corresponding version data file. From the version data files 116A, 116B, 116n, the system 102 performs report generation 118. The system 102 determines a set of performance measures to be calculated using the version data files 116A, 116B, 116n. For example, the set of performance measures to be calculated by the system 102 for report generation 118 be defined in the configuration file 112 as Measured Absolute Percentage Error (MAPE), Mean Absolute Error (MAE), Root Mean Squared Error (RMSE), model bias, data drift, an/or any combination there. The system 102 generates reports 120A, 120B, 120n from the version data files 116A, 116B, 116n.

From the reports 120A, 120B, 120n, the system 102 makes performance determinations 122. The system 102 receives, obtains, retrieves, and/or ingests a baseline file 124 that includes one or more baselines, and one or more thresholds 126. The baseline file 124 and thresholds 126 are used to validate information in the reports 120A, 120B, 120n, and generate version-performance reports 130A, 130B, 130n based on the performance determinations 122. Turning to FIG. 6, for example, box 600 surrounds a portion of computer-executable instructions for generating reports having performance measures, such as reports 120A, 120B, 120n. As discussed more below, FIG. 7 depicts a box 700 that surrounds a portion of computer-executable instructions for outputting reports having performance measures that are usable for making performance determinations.

In order to make the performance determinations 122 and validate data for inclusion in the validated version-performance reports 130A, 130B, 130n, one or more baseline values and/or one or more thresholds defined in the baseline file 124 are applied to the data in the reports 120A, 120B, 120n. In general, one or more baseline value(s) define an expected value to be predicted for a variable or event by a model version based on specified and known inputs. Therefore, a baseline 'expected' value can be used to determine whether a model version produced the same or similar value in a prediction for that variable. Accordingly, the baseline values can be used to evaluate prediction accuracy of each of the model versions 104A, 104B, 104n in comparison to such expected values. Baseline values can further include margins, for example, to determine whether a model version produced a prediction value that is or is not within a predefined buffer range of the baseline expected value for the corresponding variable. The thresholds 126 can be a target value that is a customized and/or predated minimum or maximum for gauging and evaluating performance measures, for example, such as metrics (e.g., MAPE, MAE, and/or RMSE). Additionally or alternatively, the thresholds 126 can defined values for evaluating other performance measures such as data drift, model bias, and/or noise, for example. The comparisons and determinations for each performance measure evaluated in view of the baselines and/or thresholds, for each model, are included in the version-performance reports 130A, 130B, 130n that are generated in the system 102. FIG. 10 depicts an example of version-specific performance reports 1000. The version-performance reports 130A, 130B, 130n are, in this manner, validated using the baselines and thresholds to acts as quality control guidelines or assessment measures.

When one or more baseline values and/or one or more thresholds for one or more performance measures are not met, one or more alerts 128 can be automatically generated and communicated to a database, another system, and/or a user. When a threshold and/or baseline is violated, the system 102 generates a corresponding alert that includes, for example, the identifier of the violated baseline or threshold, the identifier of the model version and the particular performance measure for which the violation occurs, the expected value(s) and/or target value(s) of the violated baseline and/or threshold, the value of the performance for which the violation was determined, and the like. FIG. 11 depicts an example alert 1100. Additionally, features within the model are analyzed with baselines. In some embodiments, the baselines are created from the training data. During the analysis of the model, the occurrence of any new features or missing features in the model data are captured. For any valid features in the model data, the data is analyzed with the baseline to capture any datatype mismatch, positive, negative, and non-zero variations or violations.

Figure 12:
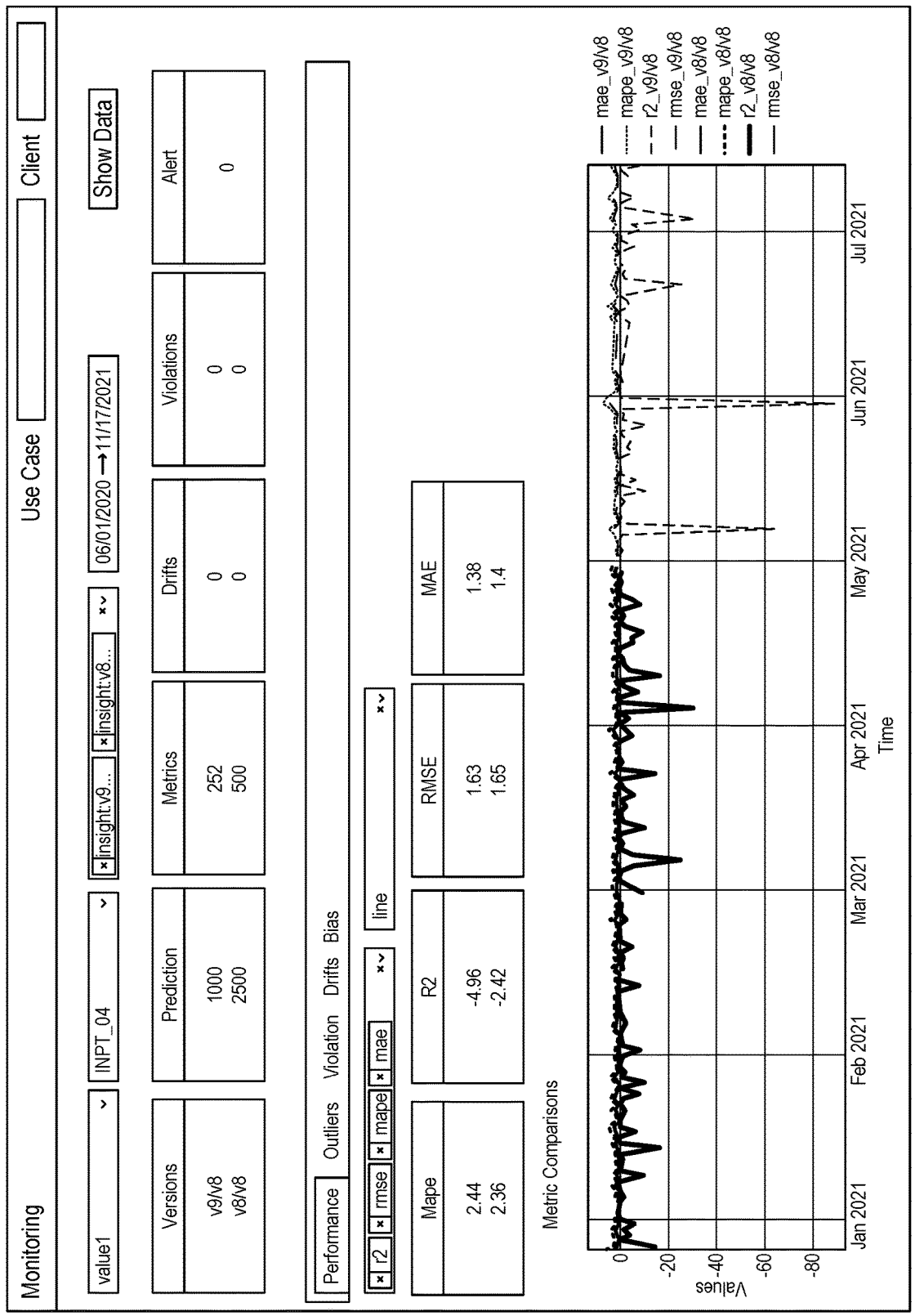
FIG. 12 depicts example graphical user interface corresponding to the dashboard monitoring module of FIG. 1, in accordance with aspects discussed herein.

Continuing, the validated version-performance reports 130A, 130B, 130n are communicated to a monitoring dashboard module 132. FIG. 12 depicts an example graphical user interface 1200 corresponding to the monitoring dashboard module 132. Although not shown in FIG. 1, additional validation(s) can be performed in the system, 102, for example, by the monitoring dashboard module 132. Generally, the monitoring dashboard module 132 determines one leading version 134 based on the validated performance measure data in the validated version-performance reports 130A, 130B, 130n. Alternatively, a plurality of leading versions may be selected as candidates for deployment. The leading version 134 may be identified and selected by the system 102 autonomously, for example, where the leading version 134 has demonstrated improved performance measures and/or superior prediction accuracy relative to at least one other version in the plurality of versions of the data model in view of the system-driven comparisons of the various performance measures in the validated version-performance reports 130A, 130B, 130n for the model versions 104A, 104B, 104n. The leading version 134 may alternatively be selected semi-autonomously by replying on user input, such as a manual user selection of the leading version 134 from a list and/or a user confirmation of the system's recommended leading version 134. The system 102 can then perform and/or trigger deployment 136 of the leading version 134 (or a plurality of leading versions of the data model). Other downstream applications, such as data science workflow 138.

Having described the system environment 100 and components thereof, it will be understood by those of ordinary skill in the art that the system environment 100 is but one example of a suitable system and is not intended to limit the scope of use or functionality of the present invention. Similarly, the system environment 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing a communication links between the components shown in FIG. 1, may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should be not be interpreted as limiting the present invention to exclude additional components and combination(s) of components. Moreover, though components are represented in FIG. 1 as singular components, it will be appreciated that some aspects may include a plurality of devices and/or components such that FIG. 1 should not be considered as limiting the number of a device or component.

Figure 13:
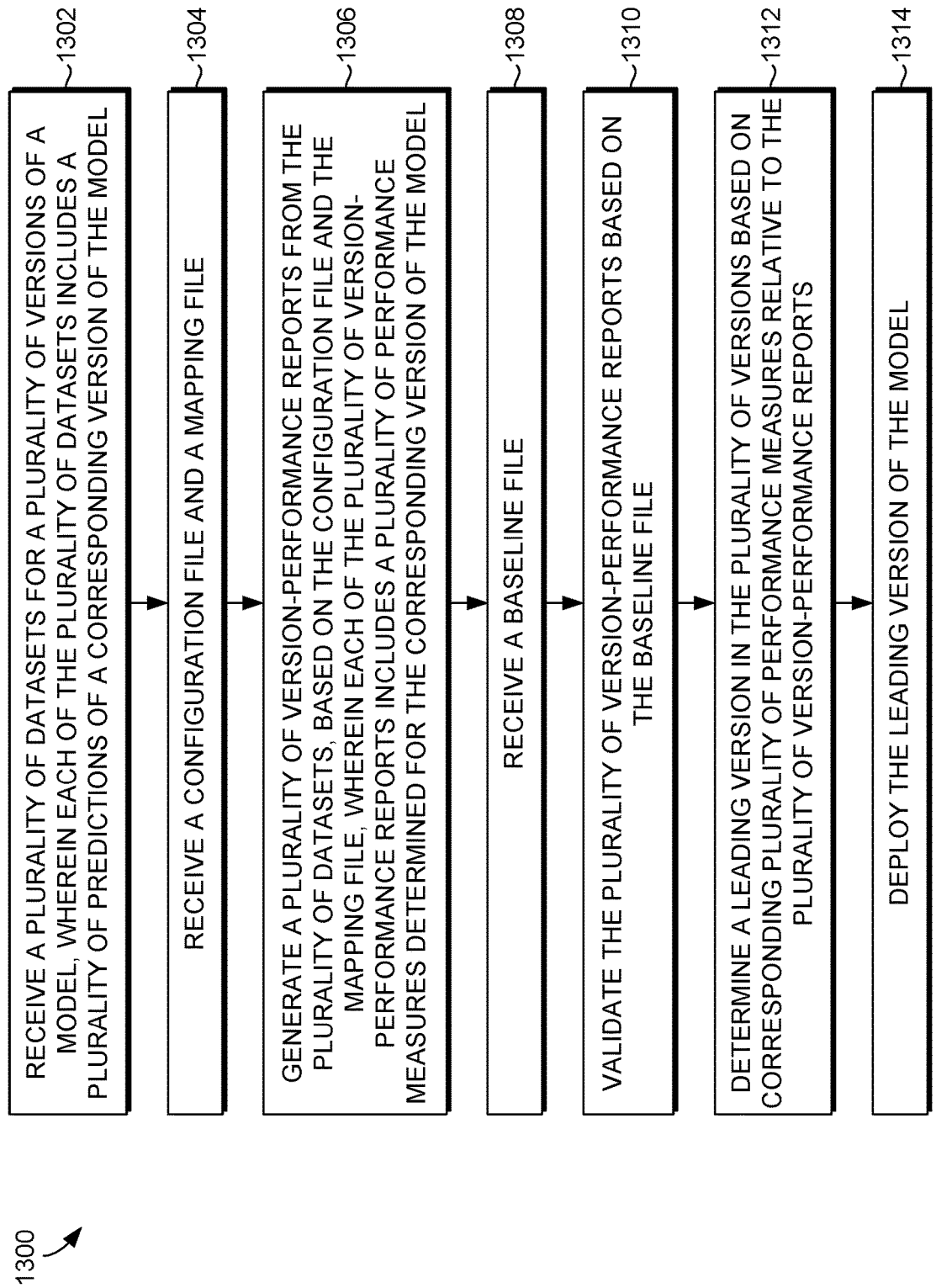
FIG. 13 is a flowchart of a method for evaluating and improving model version performance and accuracy, in accordance with the aspects discussed herein.

Turning to FIG. 13, a flowchart of a method 1300 is provided for evaluating and improving data model version performance and accuracy. The method 1300 may be computer-implemented, in some aspects. For example, one or more non-transitory computer-readable storage media having computer-readable instructions embodied thereon for execution by one or more processors can be used to implement and/or perform the method 1300 autonomously or semi-autonomously. In aspects, computer-readable and -executable instructions can include one or more scripts, such as the script(s) and script portions discussed with regard to FIGS. 2-7, that specifies the performance of the method 1300. The method 1300 can be implemented and/or performed using component(s) of software and/or hardware, in some aspects. For example, the method 1300 can be performed using software, hardware, component(s), and/or device(s) depicted in the system environment 100 of FIG. 1. The computer-readable and -executable instructions can correspond to one or more applications, in one aspect, where the application(s) can implement and/or perform all or a portion of the method 1300 autonomously or semi-autonomously.

At block 1302, a plurality of datasets are received for a plurality of versions of a model, wherein each of the plurality of datasets includes a plurality of predictions of a corresponding version of the model. In one aspect, the plurality of datasets include observed data and predictive data for the model versions 104A, 104B, 104n of FIG. 1. At block 1304, a configuration file and a mapping file are received. In one aspect, the configuration file 112 and the version mapping file 110 of FIG. 1 are received and/or ingested by the script 114. The plurality of performance measures may be specified in the configuration file, wherein the configuration file includes information customized for the model. The plurality of performance measures may include data drift and bias, metrics such as MAPE, MAE, and/or RMSE, or the like.

At block 1306, a plurality of version-performance reports are generated from the plurality of datasets, based on the configuration file and the mapping file, wherein each of the plurality of version-performance reports includes a plurality of performance measures determined for the corresponding version of the model. In one aspect, the script 114 of FIG. 1 is utilized to generate the plurality of version-performance reports. In one such aspect, the plurality of version-performance reports correspond to the version data files 116A, 116B, 116n depicted in FIG. 1. In various aspects, in order to generate the plurality of version-performance reports, a plurality of data subsets are identified from the mapping file and the subsets are extracted from the plurality of datasets. In one such aspect, each of the plurality of data subsets is extracted from one of the plurality of datasets for the corresponding version in the plurality of versions of the model. From the configuration file, a plurality of performance measures to be calculated can be identified. For each of the plurality of versions, a script is executed (e.g., script 114 of FIG. 1) that calculates the plurality of performance measures for the corresponding version of the model based on the corresponding data subset. The script also generates the version-performance report for the corresponding version of the model, in such an aspect of the method 1300.

At block 1308, a baseline file is received. In one aspect, the baseline file is the baseline file 124 of FIG. 1, which can include the thresholds 126, as previously described. At block 1310, the plurality of version-performance reports are validated based on the baseline file. In an aspect, the plurality of version-performance reports are validated using the baseline file 124 and thresholds 126 of FIG. 1. The validated plurality of version-performance reports can correspond to the version-performance reports 130A, 130B, 130n of FIG. 1, which are generated based on the performance determinations 122 of the system 102. Validating the plurality of version-performance reports can include, determining, for each of the plurality of versions, whether each of the plurality of performance measures in the version-performance report for the corresponding version at least meets a corresponding baseline and/or threshold value that is defined in the baseline file for assessment of a particular event, variable, prediction, or other performance measure. The corresponding baseline and/or threshold value can define a measure of model prediction accuracy. Further, the method 1300 can compare each of the plurality of performance measures across the plurality of version-performance reports of the plurality of versions of the model, in various aspects.

At block 1312, a leading version is determined in the plurality of versions based on the corresponding plurality of performance measures relative to the plurality of version-performance reports of other versions. Additionally or alternatively, a leading version is determined in the plurality of versions based on corresponding plurality of performance measures relative to the baselines and/or thresholds. In one aspect, the leading version corresponds to the leading version 134 of FIG. 1, which may be manually determined or autonomously determined by the system 102.

When the plurality of performance measures include data drift, the leading version can be determined, in such aspects, by determining whether a value that quantifies data drift of the leading version in the corresponding version-performance report indicates improved performance relative to values that quantity data drift of the plurality of versions. Generally, an improvement is indicated when a data drift value demonstrates that one or more mathematical means quantifying the behavior of the data model version are stable and are not fluctuating (e.g., a mathematical mean fluctuates by changing over time such that the mathematical mean is "moving" in a direction).

In an example drift calculation, model features are analyzed with baselines created from the training data. In the exemplary drift calculation, statistical information of model data with respect to the baseline data is retrieved. The drift calculation may then identify any drift present for the features within the model. Additionally, the drift calculation may operate to analyze multiple models with a respective baseline for each model. For multiple models, a baseline file may exist for each model and the features for each model may be mapped to the respective model baseline for each model.

When the plurality of performance measures include model bias, the leading version can be determined, in such aspects, by determining whether a value that quantifies model bias of the leading version in the corresponding version-performance report indicates improved performance relative to values that quantity model bias of the plurality of versions. Bias helps to understand the model progression with respect to specific features. Generally, an improvement is indicated by a model bias value that demonstrates prediction output of the data model version is the same or similar to an expected output that is based on training data. Data model bias refers to a quantified value representing the accuracy of the data model version's predictions match or deviate from a training set. As such, data model bias is quantified as a difference, for a variable, between the prediction of a variable's value from the data model version and the expected variable's value obtained via training data. In calculating the bias for a model version, insight features such as predictions from model data and from the model training data, are analyzed with a bias baseline created with the training data. This helps to generate an outcome. This outcome may be a comprehensive report describing the feature level bias progression of data with respect to the baseline over the time.

Pre training bias (evaluates features with actual label) and post training bias (evaluates features with actuals & predictions label values) are supported in some embodiments. For example, once model pipeline data (actual) has been evaluated, the model monitoring system loads a pre-processing file and baseline files into the system and executes the pre-processing algorithm to get the model insight features and actuals. The data may then be analyzed with baseline files using bias & configured metrics to calculate any pre-training bias. In another example, once model pipeline data (actual & predictions) has been evaluated, the model monitoring system loads a pre-processing file and baseline files into the system and executes the pre-processing algorithm to get the model insight features and actuals. The data may then be analyzed with baseline files using bias & configured metrics to calculate any post-training bias.

When the plurality of performance measures include a metric of Measured Absolute Percentage Error (MAPE), Mean Absolute Error (MAE), or Root Mean Squared Error (RMSE), or a combination thereof, the leading version can be determined, in such aspects, by determining whether a value that quantifies the metric of the leading version in the corresponding version-performance report indicates improved performance relative to values that quantity performance metrics of the plurality of versions.

MAPE may be generally expressed in the following example, though other expressions of MAPE are contemplated to be within the scope of aspects discussed herein:

$$MAPE = \frac{100\%}{n}\sum_{t=1}^{n}\left|\frac{A_t - F_t}{A_t}\right| \qquad (1)$$

Generally, MAE may be expressed in the following example, though other expressions of MAE are contemplated to be within the scope of aspects discussed herein:

$$MAE = \frac{\sum_{i=1}^{n}|F_i - A_i|}{n} = \frac{\sum_{i=1}^{n}|e_i|}{n} \qquad (2)$$

RMSE, generally, is the standard deviation of the prediction error. As such, it may be expressed in the following example, though other expressions of RMSE are contemplated to be within the scope of the aspects discussed herein:

$$RMSE = \sqrt{\frac{\sum_{i=1}^{n}(A_i - F_i)^2}{n}} = \sqrt{(f-o)^2} \qquad (3)$$

The leading version can be displayed via a graphical user interface that correspond to the monitoring dashboard module 132 of FIG. 1, in some aspects.

At block 1314, the leading version of the model can be deployed. Because the leading version has demonstrated improved technological performance measures and/or superior prediction accuracy relative another version (e.g., a currently in-use data model version) the leading version is deployed. The newly-deployed leading version thus replaces another version that does not perform as well. Additionally or alternatively, the leading version can be used as input to retrain the corresponding data model, and to generate additional, updated version(s) the data model.

Figure 14:
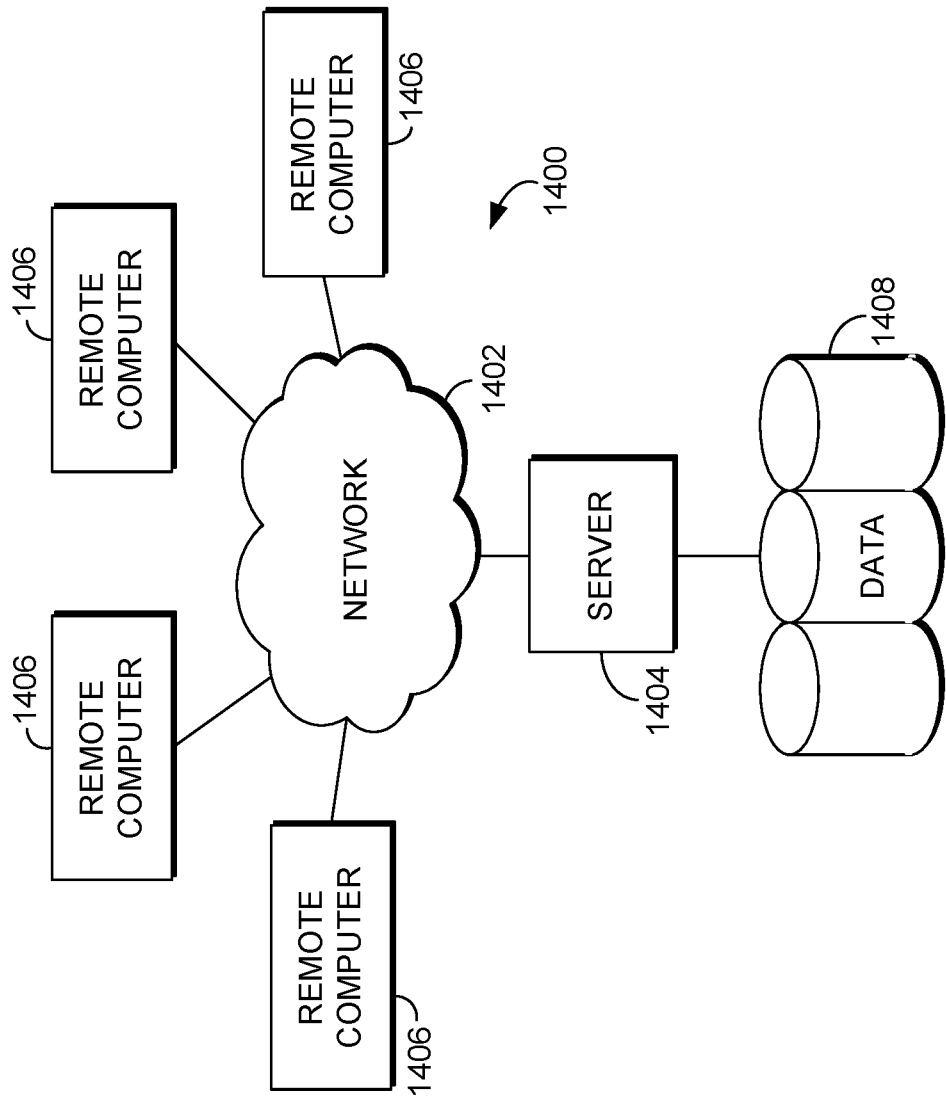
FIG. 14 is a block diagram of an example environment suitable to implement aspects of the present invention discussed herein.

Turning to FIG. 14, an example of a computing environment 1400 is depicted, in accordance with an aspect of the present invention. It will be understood by those of ordinary skill in the art that the computing environment 1400 is just one example of a suitable computing environment and is not intended to limit the scope of use or functionality of the present invention. Similarly, the computing environment 1400 should not be interpreted as imputing any dependency and/or any requirements with regard to each component and combination(s) of components illustrated in FIG. 14. It will be appreciated by those having ordinary skill in the art that the connections illustrated in FIG. 14 are also exemplary as other methods, hardware, software, and devices for establishing a communications link between the components, devices, systems, and entities, as shown in FIG. 14, may be utilized in implementation of the present invention. Although the connections are depicted using one or more solid lines, it will be understood by those having ordinary skill in the art that the exemplary connections of FIG. 14 may be hardwired or wireless, and may use intermediary components that have been omitted or not included in FIG. 14 for simplicity's sake. As such, the absence of components from FIG. 14 should not be interpreted as limiting the present invention to exclude additional components and combination(s) of components. Moreover, though devices and components are represented in FIG. 14 as singular devices and components, it will be appreciated that some aspects may include a plurality of the devices and components such that FIG. 14 should not be considered as limiting the number of a device or component.

Continuing, the computing environment 1400 of FIG. 14 is illustrated as being a distributed environment where components and devices may be remote from one another and may perform separate tasks. The components and devices may communicate with one another and may be linked to each other using a network 1402. The network 1402 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 1402, generally, provides the components and devices access to the Internet and web-based applications.

The computing environment 1400 comprises a computing device 1404 in the form of a server. Although illustrated as one component in FIG. 14, the present invention may utilize a plurality of local servers and/or remote servers in the computing environment 1400. The computing device 1404 may include components such as a processing unit, internal system memory, and a suitable system bus for coupling to various components, including a database or database cluster. In some embodiments, the database cluster takes the form of a cloud-based data store, and in some embodiments is accessible by a cloud-based computing platform. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA®) local bus, and Peripheral Component Interconnect (PCI) bus, also known as Mezzanine bus.

The computing device 1404 may include or may have access to computer-readable media. Computer-readable media can be any available media that may be accessed by computing device 1404, and includes volatile and nonvolatile media, as well as removable and non-removable media. By way of example, and not limitation, computer-readable media may include computer storage media and communication media. Computer storage media may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 1404. Computer storage media does not comprise transitory signals.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In aspects, the computing device 1404 uses logical connections to communicate with one or more remote computers 1406 within the computing environment 1400. In aspects where the network 1402 includes a wireless network, the computing device 1404 may employ a modem to establish communications with the Internet, the computing device 1404 may connect to the Internet using Wi-Fi or wireless access points, or the server may use a wireless network adapter to access the Internet. The computing device 1404 engages in two-way communication with any or all of the components and devices illustrated in FIG. 14, using the network 1402. Accordingly, the computing device 1404 may send data to and receive data from the remote computers 1406 over the network 1402.

Although illustrated as a single device, the remote computers 1406 may include multiple computing devices. In an aspect having a distributed network, the remote computers 1406 may be located at one or more different geographic locations. In an aspect where the remote computers 1406 is a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some aspects, the remote computers 1406 is physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other aspects, the remote computers 1406 may be physically located in a non-medical setting, such as a packing and shipping facility or deployed within a fleet of delivery or courier vehicles.

Continuing, the computing environment 1400 includes a data store 1408. Although shown as a single component, the data store 1408 may be implemented using multiple data stores that are communicatively coupled to one another, independent of the geographic or physical location of a memory device. Exemplary data stores may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, and/or audit trails for workflows. Exemplary data stores may also store data in the form of electronic records, for example, electronic medical records of patients, transaction records, billing records, task and workflow records, chronological event records, and the like.

Generally, the data store 1408 includes physical memory that is configured to store information encoded in data. For example, the data store 1408 may provide storage for computer-readable instructions, computer-executable instructions, data structures, data arrays, computer programs, applications, and other data that supports the functions and action to be undertaken using the computing environment 1400 and components shown in exemplary FIG. 14.

In a computing environment having distributed components that are communicatively coupled via the network 1402, program modules may be located in local and/or remote computer storage media including, for example only, memory storage devices. Aspects of the present invention may be described in the context of computer-executable instructions, such as program modules, being executed by a computing device. Program modules may include, but are not limited to, routines, programs, objects, components, and data structures that perform particular tasks or implement particular abstract data types. In aspects, the computing device 1404 may access, retrieve, communicate, receive, and update information stored in the data store 1408, including program modules. Accordingly, the computing device 1404 may execute, using a processor, computer instructions stored in the data store 1408 in order to perform aspects described herein.

Although internal components of the devices in FIG. 14, such as the computing device 1404, are not illustrated, those of ordinary skill in the art will appreciate that internal components and their interconnection are present in the devices of FIG. 14. Accordingly, additional details concerning the internal construction device are not further disclosed herein.

The present invention has been described in relation to particular aspects, which are intended in all respects to be illustrative rather than restrictive. Further, the present invention is not limited to these aspects, but variations and modifications may be made without departing from the scope of the present invention.

What is claimed is:

1. A computerized method for evaluating and improving data model version performance and/or accuracy, the computerized method comprising:
   receiving a plurality of datasets for a plurality of versions of a data model, wherein each of the plurality of datasets includes a plurality of predictions of a corresponding version of the data model in the plurality of versions of the data model;
   receiving a configuration file and a mapping file;
   generating a plurality of version-performance reports from the plurality of datasets based on the configuration file and the mapping file, wherein each of the plurality of version-performance reports of the plurality of versions of the data model includes a plurality of performance measures determined for the corresponding version of the data model in the plurality of versions of the data model;
   receiving a baseline file;
   validating the plurality of version-performance reports of the plurality of versions of the data model based on the baseline file;
   determining a leading version of the data model in the plurality of versions of the data model based on a corresponding version-performance report of the leading version of the data model in the plurality of versions of the data model indicating that the leading version of the data model in the plurality of versions of the data model has improved performance and/or accuracy relative to at least one other version in the plurality of versions of the data model; and
   deploying the leading version of the data model in the plurality of versions of the data model to replace a currently in-use version of the data model in the plurality of versions of the data model.

2. The computerized method of claim 1, wherein generating the plurality of version-performance reports from the plurality of datasets based on the configuration file and the mapping file, comprises:

identifying, from the mapping file, a plurality of data subsets to extract from the plurality of datasets; and extracting the plurality of data subsets from the plurality of datasets, wherein each of the plurality of data subsets is extracted from one of the plurality of datasets for the corresponding version of the data model in the plurality of versions of the data model.

3. The computerized method of claim 2, wherein generating the plurality of version-performance reports from the plurality of datasets based on the configuration file and the mapping file, comprises:

identifying, from the configuration file, the plurality of performance measures to calculate.

4. The computerized method of claim 3, wherein generating the plurality of version-performance reports from the plurality of datasets based on the configuration file and the mapping file, comprises:

for each of the plurality of versions of the data model, executing a computer script that:
calculates the plurality of performance measures for the corresponding version of the data model in the plurality of versions of the data model based on a corresponding data subset extracted from the plurality of datasets; and
generates a version-performance report for the corresponding version of the data model in the plurality of versions of the data model.

5. The computerized method of claim 4, wherein validating the plurality of version-performance reports of the plurality of versions of the data model based on the baseline file comprises:

for each of the plurality of versions of the data model, determining whether each of the plurality of performance measures in the version-performance report for the corresponding version of the data model in the plurality of versions of the data model at least meets a corresponding threshold defined in the baseline file, wherein the corresponding threshold defines a measure of data model prediction accuracy.

6. The computerized method of claim 5, further comprising comparing each of the plurality of performance measures across the plurality of version-performance reports of the plurality of versions of the data model.

7. The computerized method of claim 1, wherein the plurality of performance measures include data drift, and wherein determining the leading version of the data model in the plurality of versions of the data model comprises:

determining a value that quantifies data drift of the leading version of the data model in the plurality of versions of the data model in a corresponding version-performance report that indicates improved performance relative to values that quantify data drift of the plurality of versions of the data model.

8. The computerized method of claim 1, wherein the plurality of performance measures include model bias, and wherein determining the leading version of the data model in the plurality of versions of the data model comprises:

determining a value that quantifies model bias of the leading version of the data model in the plurality of versions of the data model in a corresponding version-performance report that indicates improved performance relative to values that quantify model bias of the plurality of versions of the data model.

9. The computerized method of claim 1, wherein the plurality of performance measures include at least one performance metric of Measured Absolute Percentage Error (MAPE), Mean Absolute Error (MAE), or Root Mean Squared Error (RMSE), and wherein determining the leading version of the data model in the plurality of versions of the data model comprises:

determining a value that quantifies the at least one performance metric of MAPE, MAE, or RMSE of the leading version of the data model in the plurality of versions of the data model in a corresponding version-performance report that indicates improved performance relative to values that quantify performance metrics of the plurality of versions of the data model.

10. The computerized method of claim 1, further comprising retraining the data model utilizing the leading version of the data model in the plurality of versions of the data model.

11. The computerized method of claim 1, wherein the plurality of performance measures are specified in the configuration file that is customized for the data model, and wherein the plurality of performance measures include data drift and model bias.

12. One or more non-transitory computer-readable media having computer-executable instructions embodied thereon that, when executed, perform a method for evaluating and/or improving data model version performance and accuracy, the method comprising:

receiving a plurality of datasets for a plurality of versions of a data model, wherein each of the plurality of datasets includes a plurality of predictions of a corresponding version of the data model in the plurality of versions of the data model;

receiving a configuration file and a mapping file;

generating a plurality of version-performance reports from the plurality of datasets based on the configuration file and the mapping file, wherein each of the plurality of version-performance reports of the plurality of versions of the data model includes a plurality of performance measures determined for the corresponding version of the data model in the plurality of versions of the data model;

receiving a baseline file;

validating the plurality of version-performance reports of the plurality of versions of the data model based on the baseline file;

determining a leading version of the data model in the plurality of versions of the data model based on a corresponding version-performance report of the leading version of the data model in the plurality of versions of the data model indicating that the leading version of the data model in the plurality of versions of the data model has improved performance and/or accuracy relative to at least one other version in the plurality of versions of the data model; and deploying the leading version of the data model in the plurality of versions of the data model to replace a currently in-use version of the data model in the plurality of versions of the data model.

13. The one or more non-transitory computer-readable media of claim 12, wherein generating the plurality of version-performance reports from the plurality of datasets based on the configuration file and the mapping file, comprises:

identifying, from the mapping file, a plurality of data subsets to extract from the plurality of datasets; and extracting the plurality of data subsets from the plurality of datasets, wherein each of the plurality of data subsets is extracted from one of the plurality of datasets for the corresponding version of the data model in the plurality of versions of the data model.

14. The one or more non-transitory computer-readable media of claim 13, wherein generating the plurality of version-performance reports from the plurality of datasets based on the configuration file and the mapping file, comprises:
identifying, from the configuration file, the plurality of performance measures to calculate.

15. The one or more non-transitory computer-readable media of claim 14, wherein generating the plurality of version-performance reports from the plurality of datasets based on the configuration file and the mapping file, comprises:
for each of the plurality of versions of the data model, executing a computer script that:
calculates the plurality of performance measures for the corresponding version of the data model in the plurality of versions of the data model based on a corresponding data subset extracted from the plurality of datasets; and
generates a version-performance report for the corresponding version of the data model in the plurality of versions of the data model.

16. The one or more non-transitory computer-readable media of claim 15, wherein validating the plurality of version-performance reports of the plurality of versions of the data model based on the baseline file comprises:
for each of the plurality of versions of the data model, determining whether each of the plurality of performance measures in the version-performance report for the corresponding version of the data model in the plurality of versions of the data model at least meets a corresponding threshold defined in the baseline file, wherein the corresponding threshold defines a measure of data model prediction accuracy.

17. The one or more non-transitory computer-readable media of claim 16, further comprising comparing each of the plurality of performance measures across the plurality of version-performance reports of the plurality of versions of the data model.

18. The one or more non-transitory computer-readable media of claim 12, wherein the plurality of performance measures include at least one performance metric of Measured Absolute Percentage Error (MAPE), Mean Absolute Error (MAE), or Root Mean Squared Error (RMSE), and wherein determining the leading version of the data model in the plurality of versions of the data model comprises two or more of:
determining a value that quantifies data drift of the leading version of the data model in the plurality of versions of the data model in a corresponding version-performance report that indicates improved performance relative to values that quantify data drift of the plurality of versions of the data model;
determining a value that quantifies model bias of the leading version of the data model in the plurality of versions of the data model in a corresponding version-performance report that indicates improved performance relative to values that quantify model bias of the plurality of versions of the data model; and
determining a value that quantifies the at least one performance metric of MAPE, MAE, or RMSE of the leading version of the data model in the plurality of versions of the data model in a corresponding version-performance report that indicates improved performance relative to values that quantify performance metrics of the plurality of versions of the data model.

19. The one or more non-transitory computer-readable media of claim 12, further comprising retraining the data model utilizing the leading version of the data model in the plurality of versions of the data model.

20. A system for evaluating and improving model version performance and/or accuracy, the system comprising:
one or more processors;
a data model performance monitoring system that, via the one or more processors executing a script:
receives a plurality of datasets for a plurality of versions of a data model, wherein each of the plurality of datasets includes a plurality of predictions of a corresponding version of the data model in the plurality of versions of the data model;
receives a configuration file and a mapping file;
generates a plurality of version-performance reports from the plurality of datasets based on the configuration file and the mapping file, wherein each of the plurality of version-performance reports of the plurality of versions of the data model includes a plurality of performance measures determined for the corresponding version of the data model in the plurality of versions of the data model;
receives a baseline file; and
validates the plurality of version-performance reports of the plurality of versions of the data model based on the baseline file; and
a monitoring dashboard module that, via the one or more processors executing a script:
determines a leading version of the data model in the plurality of versions of the data model based on a corresponding plurality of performance measures in a version-performance report of the leading version of the data model in the plurality of versions of the data model relative to the plurality of version-performance reports of the plurality of versions of the data model, wherein a corresponding version-performance report of the leading version of the data model in the plurality of versions of the data model indicates that the leading version of the data model in the plurality of versions of the data model has improved performance and/or accuracy relative to other versions in the plurality of versions of the data model; and
deploys the leading version of the data model in the plurality of versions of the data model to replace a currently in-use version of the data model in the plurality of versions of the data model.

* * * * *